US 6,636,318 B2

United States Patent
Sarathy et al.

(10) Patent No.: US 6,636,318 B2
(45) Date of Patent: Oct. 21, 2003

(54) BIT-RATE AND FORMAT INSENSITIVE ALL-OPTICAL CIRCUIT FOR RESHAPING, REGENERATION AND RETIMING OF OPTICAL PULSE STREAMS

(75) Inventors: Jithamithra Sarathy, Atlantic Highlands, NJ (US); Bharat Dave, Howell, NJ (US); Boris Stefanov, Gillette, NJ (US); Ronald Simprini, Red Bank, NJ (US); Tan B. Thai, Jackson, NJ (US); Roman Antosik, Colts Neck, NJ (US); Aleksandr Miglo, Ocean, NJ (US); Olga Nedzhvetska, Eatontown, NJ (US); Kwang Kim, Red Bank, NJ (US); Doruk Engin, Rye, NY (US)

(73) Assignee: Alphion Corp., Eatontown, NJ (US)

( * ) Notice: Subject to any disclaimer, the term of this patent is extended or adjusted under 35 U.S.C. 154(b) by 21 days.

(21) Appl. No.: 09/971,784

(22) Filed: Oct. 5, 2001

(65) Prior Publication Data

US 2002/0079486 A1 Jun. 27, 2002

Related U.S. Application Data

(63) Continuation-in-part of application No. 09/849,441, filed on May 4, 2001, now Pat. No. 6,563,621, and a continuation-in-part of application No. 09/848,968, filed on May 4, 2001, now Pat. No. 6,570,697.
(60) Provisional application No. 60/238,296, filed on Oct. 6, 2000.

(51) Int. Cl.$^7$ .............................. G01B 9/02; G02B 26/00

(52) U.S. Cl. .......................... 356/450; 356/477; 359/238

(58) Field of Search .................................. 356/450, 477; 359/185, 238

(56) References Cited

U.S. PATENT DOCUMENTS

| 5,434,692 A | 7/1995 | Auffret et al. ............... 359/158 |
| 5,754,714 A | 5/1998 | Suzuki et al. .................. 385/5 |

(List continued on next page.)

FOREIGN PATENT DOCUMENTS

| EP | 0 901 245 A1 | 10/1998 | ........... H04B/10/17 |
| GB | WO 93/22855 | 11/1993 | ........... H04L/7/027 |
| JP | 411101922 A | 3/1998 | ........... G02B/6/293 |

OTHER PUBLICATIONS

Lee et al. All–fibre–optic clock recovery from non–return–to–zero format data. Electronics Letters. Mar. 5th, 1998. Vol. 34. No. 5 pp. 478–480.*

(List continued on next page.)

Primary Examiner—Thomas G. Black
Assistant Examiner—Deandra M. Hughes
(74) Attorney, Agent, or Firm—Kaplan & Gilman, LLP (57) ABSTRACT

A method and system for AO3R functionality is presented. The system includes an AO2R device followed by an AOCR clock recovery module and an AOR retiming device. The AOR retiming device takes as input a recovered clock signal extracted from the output of the AO2R by the AOCR clock recovery module. The output is the recovered clock signal gated by the regenerated and reshaped input signal, and a monitor circuit is used to set the optimum operations of the retiming device. In a first embodiment the output of the AOR retiming device is fed to an AOC code and wavelength conversion output stage, which returns the signal to the NRZ coding, on a service wavelength converted to match the fixed wavelength connection with the DWDM transmission system. In a second embodiment the code conversion is incorporated into the AOR retiming device, and wavelength conversion is accomplished in the AOCR clock recovery device.

17 Claims, 9 Drawing Sheets

U.S. PATENT DOCUMENTS

| | | | |
|---|---|---|---|
| 5,798,852 A | 8/1998 | Billes et al. | 359/158 |
| 5,999,293 A | 12/1999 | Manning | 359/139 |
| 6,118,564 A | 9/2000 | Ooi et al. | 359/139 |
| 6,122,306 A | 9/2000 | Sartorius et al. | 372/96 |
| 6,226,090 B1 | 5/2001 | Yoneyama | 356/450 |
| 6,229,633 B1 | 5/2001 | Roberts et al. | 359/135 |
| 6,271,961 B1 | 8/2001 | Emery et al. | 359/332 |
| 6,335,813 B1 | 1/2002 | Janz et al. | 359/181 |
| 6,366,382 B1 | 4/2002 | Morthier et al. | 359/179 |
| 6,384,954 B1 | 5/2002 | Webb | 359/245 |
| 6,388,753 B1 | 5/2002 | Hall et al. | 356/450 |
| 2001/0053008 A1 * | 12/2001 | Ueno | 359/158 |

OTHER PUBLICATIONS

Lee et al. Passive all optical non–return–tozero to pseudo–return–to–zero signal conversion for all optical clock recovery. LEOS 1996. Pp. 113–114.*

Rees et al. A theoretical Analysis of Optical Clock Extraction Using a Self–Pulsatign Laser Didoe. IEEE Journal of Quantum Electronics. Vol. 35. No. 2, pp. 221–227. Feb. 1999.*

All–Optical Timing Extraction . . . Nov. 10, 1988 vol. 24 No. 23 Electronics Letters.

All–Optical Clock Recovery . . . P. E. Barnsley, et al. 10/91 IEEE Photonics Tech.

A High–Speed Photonic Clock . . . —X. Steve Yao 5/96 IEEE Photonics Tech.

Passive all optical non–return–to–zero to pseudo–return–to–zero . . . Chang–Hee Lee 11/96 Lasers and Electro–Optics Society.

All–Fiber–Optic Clock Recovery from non–return to zero format data—Hak Kyu Lee 2/98 Optical Fiber Comm. Conference.

20 Gbit/s all–optical regeneration and wavelength conversion . . . G. Raybon 2/99 Optical Fiber Comm. Conf.

40–Gb/s All–optical wavelength conversion . . . D. Wolfson et al. 3/00 IEEE Photonics Tech.

Optical 3R Regenerator Using Wavelength Converters . . . T. Otani 4/00 IEEE Photonics Tech.

All–Optical 3R regenerators: Status and Challenges F. Devaux 4/00 IEEE.

Frequency Conversion and Analysis Martin Zirngibl 5/00 CLEO.

40 Gbit/s OTDM–WDM transmultiplexers Mario Puleo 9/00 Lasers & Electro–Optics.

All–Optical 3R Regeneration B. Lavigue et al. 11/00 Lasers & Electro–Optics.

Nonlinear Dynamics for All–Optical 3R Regeneration Guifang Li et al. 11/00 Lasers & Electro–Optics.

All–Optical Clock Recovery for 3R Optical Regeneration Bernd Sartorius 3/01 Optical Fiber Comm. Conf.

Ultrafast Wavelength and Polarization Insensitive All–Optical Clock Recovery Weiming Mao et al. 3/01 Optical Fiber Comm. Conf.

Optical sampling measurement with all–optical clock recovery using mode–locked diode lasers M. Shirane, et al. 3/01 Optical Fiber Comm. Conf.

* cited by examiner

BIT-RATE AND FORMAT INSENSITIVE ALL-OPTICAL CIRCUIT FOR RESHAPING, REGENERATION AND RETIMING OF OPTICAL PULSE STREAMS

CROSS REFERENCE TO OTHER APPLICATIONS

This application claims the benefit of U.S. Provisional Patent Application No. 60/238,296 filed Oct. 6, 2000. This application is a Continuation-in-Part of U.S. patent application Ser. No. 09/849,411 filed May 4, 2001 and U.S. patent application Ser. No. 09/843,968 filed May 4, 2000 now U.S. Pat. Nos. 6,563,621 and 6,570,697 (the "Parent Applications"), the complete specification of each of which is hereby incorporated herein by this reference.

TECHNICAL FIELD

This invention relates to telecommunications, and more specifically, to an improved system and method for the all optical reshaping, regeneration and retiming ("AO3R") of optical signals in a data network, precluding any need for Optical-Electrical-Optical ("OEO") conversion.

BACKGROUND OF THE INVENTION

Noise, timing jitter, and attenuation in long-haul optical line systems result in the deterioration of the transmitted signal. Consequently, one of the fundamental requirements of nodal equipment in optical networks is the capability to regenerate, reshape and retime (3R Regeneration) the optical pulses. Notwithstanding the plethora of claims by various companies to have implemented "all-optical" systems, presently retiming of the optical pulses is achieved by converting the incoming optical signal into an electrical signal. This is followed by full regeneration and retiming of the electrical signal using Application Specific Integrated Circuits (ASICs). A laser source is then modulated using this fully regenerated and retimed electrical signal. However, there are certain drawbacks to converting an optical signal into an electrical one and back again. First, electrical processing of data signals is not transparent to bit rate and is format sensitive. Thus, an OEO system could not process an arbitrary incoming data signal; the bit rate, format and coding would need to be known a priori. Second, there is a significant power loss in converting to the electrical domain, and back again therefrom to the optical domain.

As optical networks become increasingly transparent, there is thus a need to regenerate the signal without resorting to Optical-to-electrical, or OEO, conversion of the signal.

At present, signal coding in optical networks generally takes the Non-Return to Zero (NRZ) code. In such coding, the signal level of the high bit does not return to zero during a portion of the incoming signal, which consists of a series of high bits. NRZ coding is the coding of choice today in optical communications systems due to the signal bandwidth efficiency associated with it. This code has thus been used for optical line systems operating at line rates up to 10 Gb/s. However, as service line rates increase to 40 Gb/s, for reasons associated with fiber dispersion and reduction in inter-symbol interference (ISI) penalties, Return-to-Zero (RZ) coding is generally favored. In RZ coding, the signal returns to zero in each and every bit period.

Future optical networking line systems will incorporate service signals at both 10 Gb/s as well as 40 Gb/s along with their associated Forward Error Corrected (FEC) overhead. The FEC rates related to 10 Gb/s data transport include the 64/63 coding for 10 Gb/s Ethernet, the 15/14 encoding of SONET-OC192 FEC and the strong-FEC rate of 12.25 Gb/s, as well as numerous potential coding schemes yet to be developed. Effectively, to support multiple FEC—and other coding related—protocols, an optical network node must be able to process numerous line rates.

As the networks tend towards optical transparency, the nodal devices in the optical network must work with all available line rates independent of their coding. One of the fundamental functions of these devices is the capability to extract the clock from the signal wholly in the optical domain. The RF spectrum of an RZ signal reveals a strong spectral component at the line rate. Consequently, the incoming signal can be used directly to extract the clock signal. In the case of the NRZ signal format, the RF spectrum reveals no spectral component at the line rate. The RF spectrum of an ideal NRZ signal looks like a sinc function with the first zero at the line rate. As described in the Parent Applications, the fundamental problem of all-optical clock recovery from an NRZ signal is the generation of a RF spectral component at the line rate. As therein described, an NRZ/PRZ (Non-return to Zero/Pseudo Return to Zero) converter is used to generate the strong line rate frequency component by converting the incoming NRZ signal into an RZ-like signal.

As a consequence of the above, the clock recovery in these network elements must be tunable over a wide range of frequencies. What is needed therefore, is an AO3R system, that is truly all-optical, and that is tunable over a wide range of bit-rate frequencies and works in the carrier frequency range (wavelength range) of the modern telecommunications systems, the C and L wavelength bands.

SUMMARY OF THE INVENTION

A method and system for AO3R functionality is presented. The system includes an AO2R device followed by an AOCR clock recovery module and an AOR retiming device. The AOR retiming device takes as input a recovered clock signal extracted from the output of the AO2R by the AOCR clock recovery module. The output is the recovered clock signal gated by the regenerated and reshaped input signal, and a monitor circuit is used to set the optimum operations of the retiming device. In a first embodiment the output of the AOR retiming device is fed to an AOC code and wavelength conversion output stage, which returns the signal to the NRZ coding, on a service wavelength converted to match the fixed wavelength connection with the DWDM transmission system. In a second embodiment the code conversion is incorporated into the AOR retiming device, and wavelength conversion is accomplished in the AOCR clock recovery device.

Previous schemes for performing the O3R functionality use some level of Optical-to-electronic (OEO) conversion to generate the clock signal. The AO3R scheme presented here carries out all three functions in the optical domain, and returns a clean output signal using identical coding as the input, on a wavelength of choice.

A lossy component, such as an optical cross-connect switch can be placed either before the AO3R device or inside of it after the AO2R device and before the signal is split to the AOCR clock recovery and the AOR retiming devices.

DETAILED DESCRIPTION OF THE PREFERRED EMBODIMENTS

Figure 1:
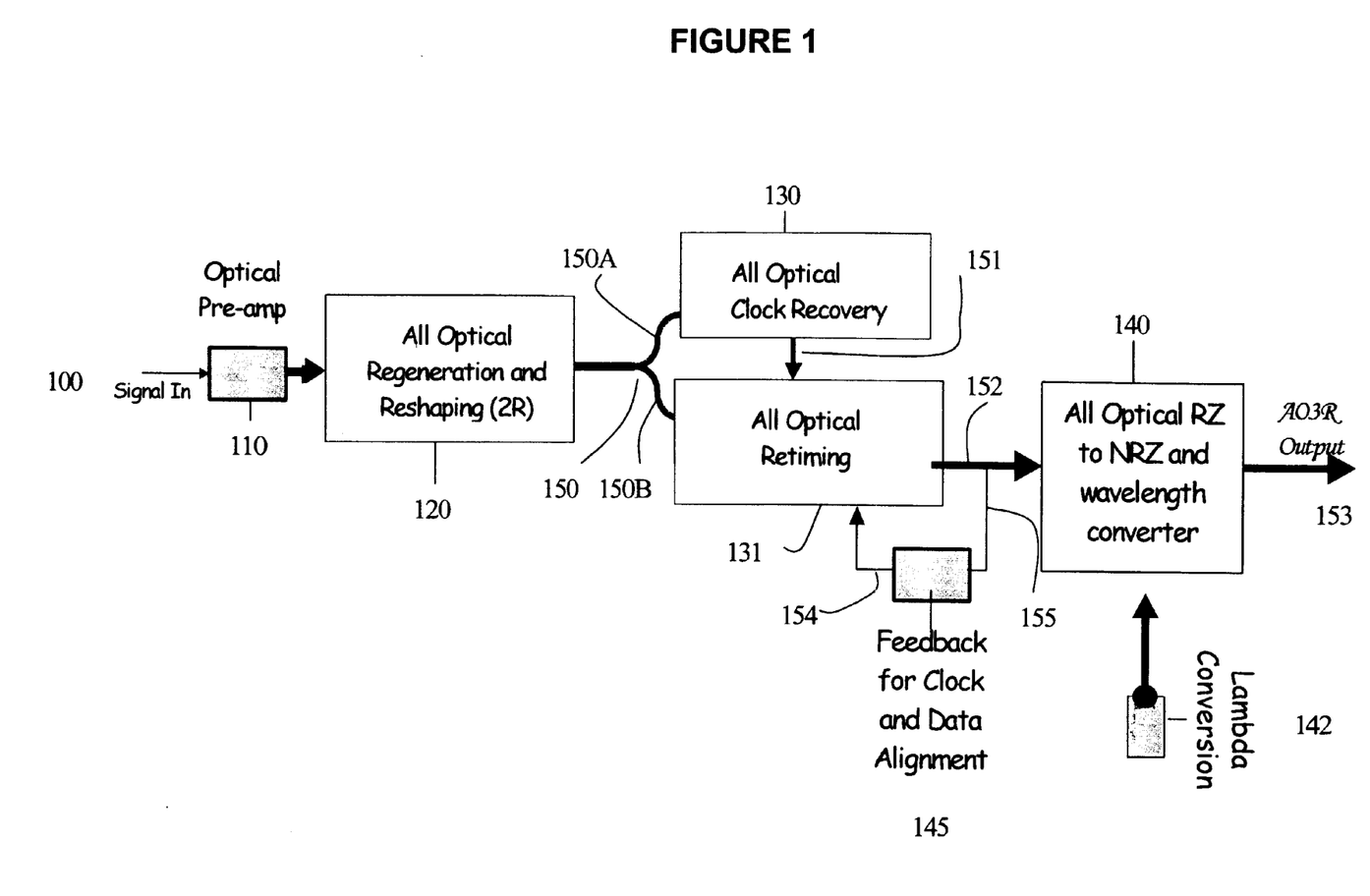
FIG. 1 depicts a schematic diagram of the system of the present invention according to a first embodiment.

A schematic diagram of the AO3R device is shown in FIG. 1. The input stage 110 comprises an optical amplifier to boost the incoming signal. The all-optical 2R device that follows 120 essentially removes the noise from the boosted signal and reshapes it into a square wave with a high extinction ratio. This device can be implemented in many ways. Commercially available devices that use a Semiconductor Optical Amplifier-Mach Zehnder Interferometer (SOA-MZI) can be utilized for this purpose. Other embodiments that take advantage of four-wave mixing non-linearities in fiber and SOA can also be used for this purpose.

The signal is then split into two parts, as depicted at point 150 in the figure. The splitting ratio can range from −3 dB to −10 dB. One part of the signal 150A is input into a clock recovery module 130, and the other part of the signal 150B is input into an all-optical retiming (AOR) module 131. The clock recovery module 130 is an all-optical device. There is no conversion of the optical signal into the electrical domain. The device and method of such all-optical clock recovery are discussed in detail in U.S. Pat. No. 6,563,621. The preprocessor extracting the line rate comprising the first stage of the clock recovery module is discussed in detail in U.S. patent application No. 09/848,968.

Figure 2:
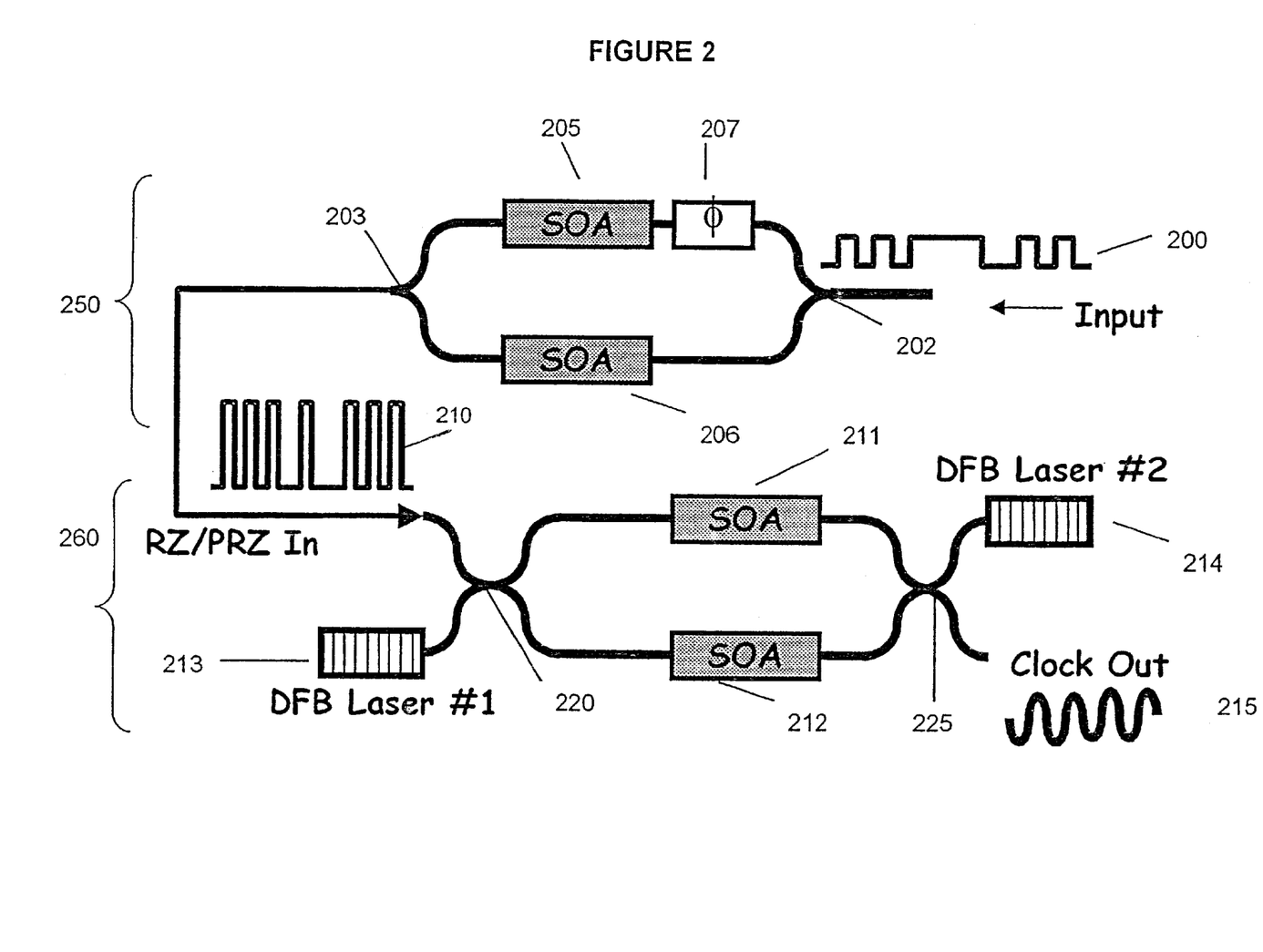
FIG. 2 depicts a schematic diagram of the all-optical clock recovery stage depicted in FIG. 1.

A schematic description of the clock recovery is shown in FIG. 2. The NRZ to PRZ line rate recovery pre-processor 250 forms the first stage of the AOCR scheme. This consists of a path-delayed Asymmetric Mach-Zehnder Interferometer (AMZI). The AMZI incorporates Semiconductor Optical Amplifiers (SOAs) 205, 206 in each of the arms and a phase delay 207 in one of the arms. The line delay is set so that the phase difference between the arms is π. The AMZI is set for destructive interference of the signals in the two paths. Consequently, the interference of a high bit with its path delayed and π-phase inverted copy, generates an RZ-like bit, termed a PRZ bit, at both the leading and falling edges of the original high bit. This latter signal, with a bit rate effectively double that of the original NRZ bit rate, is the PRZ output signal.

This effective doubling of the bit rate leads to the generation of a large component of the line rate frequency in the RF spectrum of the output signal 210 of the AMZI 250. Generally, unless the input signal is exceptionally aberrant, this line rate frequency will be the far and away dominant frequency in the spectrum. Since the preprocessor does not need to know a priori the actual bit rate or coding of the input data to operate, the extraction of the line rate is data rate and format insensitive. For obvious reasons, it is wavelength insensitive as well.

Thus the preprocessor has the ability to reshape the PRZ signal as well as adjust its duty cycle. The output 210 of the first stage 250 becomes the input to the second stage 260. In a preferred embodiment, the second stage 260 comprises a symmetric Mach-Zehnder Interferometer, where each arm contains a semiconductor optical amplifier 211 and 212, respectively.

The principle of clock recovery is based on inducing oscillations between the two lasers DFB1 213 and DFB2 214. The oscillations are triggered by the output of the first stage 210. As described above, this output can be either RZ or PRZ. The current to DFB2 214 is tuned close to its lasing threshold, with DFB1 213 energized so as to be in lasing mode. Thus the trigger pulse 210 induces lasing in DFB2 214. The feedback from DFB2 214 turns off the lasing in DFB1 213 resulting in DFB2 214 itself turning off. The reduced feedback from DFB2 214 now returns DFB1 213 to lasing. In this manner the two lasers mutually stimulate one another in oscillation. Recalling that the dominant frequency in the input signal 210 is the original signal's 200 clock rate, pulses from the input 210 are sufficient to lock the oscillation of the DFB lasers at that rate, and, in general, to hold for quite a number of low bits (such as would appear where the original signal 200 had a long run of high bits). Thus, the forced triggering by the PRZ/RZ input 210 locks the phase of the oscillations at the original signal's 200 clock rate.

The interferometer improves the control of the phase input to DFB2 214. The use of the SOA-MZI facilitates the tuning of the oscillation rate by adjusting the input signal phase into DFB2 214. As the phase of the MZI output is tuned, the gain recovery time of DFB2 214 is adjusted. This results in the oscillation rate being altered. In this manner the clock frequency can be further tuned to the desired line rate. Using non-linear SOA elements also allows shaping of the output clock with a lesser energy expenditure. Moreover, by adjusting the currents in each of the two SOAs in the second stage interferometer, the refractive index of each SOA's waveguide can be manipulated, thus altering the phase of the pulse entering DFB2 214 thus adjusting the phase of the oscillations to align it to the phase of the retimed input signal, 152 in FIG. 1. Thus, the oscillation rate and phase of the circuit can be altered. The identical circuit can be tuned to the various bit rates available in the network, thus rendering a system that is bit rate independent.

Figure 3:
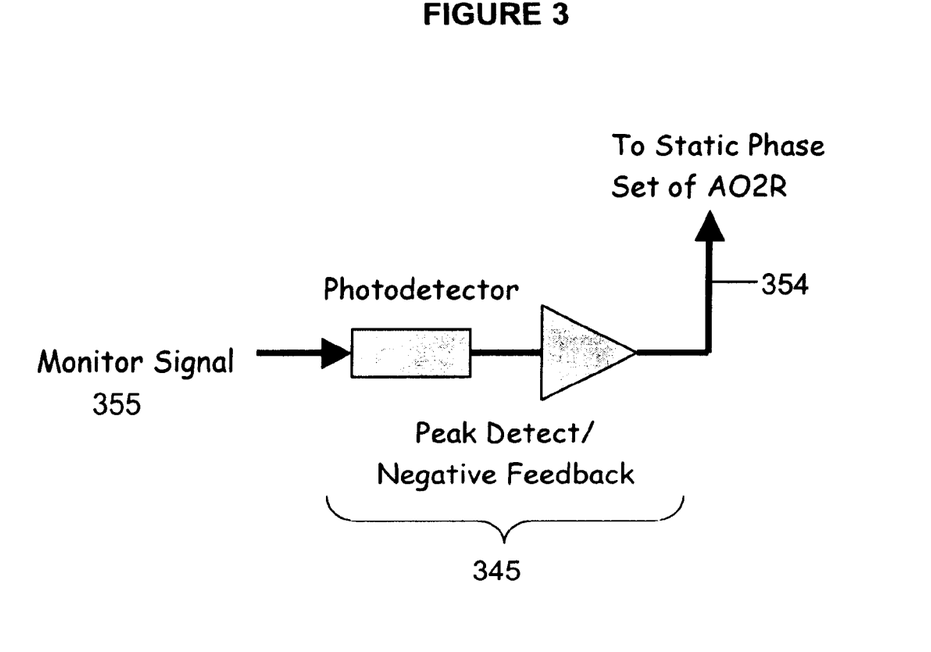
FIG. 3 depicts the feedback circuit for data/clock phase alignment according to the present invention.

Referring again to FIG. 1, as above, the second part of the signal 150B derived from the AO2R 120 is input into the AOR retiming device 131 along with the line rate clocking signal 151, which was recovered in the AOCR clock recovery module 130 and output therefrom, the process of which being as depicted in FIG. 2. In the AOR the clocking signal 151 is AND gated with the regenerated and reshaped input signal 150B, to give the output 152 of the AOR 131. A feedback circuit 145 ensures that the clock signal 151 and the data signal 152 are phase aligned. This feedback circuit 145 can be implemented, for example, by a simple photodetector-based circuit that monitors the DC power level at the output of the AOR 152 to ensure that the signal level is maximized, as shown in FIG. 3. The monitor signal 155, seen as 355 in FIG. 3, passes to the photodetector and peak detector, 345 in FIG. 3 (corresponding to the feedback circuit 145 in FIG. 1), generating a negative feedback signal 354, corresponding to signal 154 in FIG. 1. The negative feedback from this feedback circuit tunes the static phase condition of the AOR (i.e. by adjusting the tuning currents controlling the SOAs in the MZI of the AOR, as described below) such that the detected photocurrent is a maximum. This indicates an optimum phase shift between the original signal 100 and the recovered clock 151 in the AOR retiming circuit.

The output of the AOR 131 is fed into the all-optical RZ to NRZ and wavelength converter 140. A CW (continuous wavelength) laser source in the coding converter is utilized to execute wavelength conversion. This functionality is depicted by the Lambda Conversion module 142 in FIG. 1.

Recalling the functionality of the AOCR module, as described in U.S. patent application Nos. 09/849,441 and 09/848,968, the clock recovery transforms an NRZ input signal to a PRZ signal. If the network is set up to run NRZ coded data, the output has to be transformed back to NRZ coding. As well, network conditions and provisioning may desire that the input data signal be carried on a different outgoing wavelength than the one that brought it in. Thus, wavelength conversion is supplied at the output stage. In an alternative embodiment, as described below, the wavelength conversion can be accomplished in the AOCR device 130, and the code conversion integrated into the AOR device 131, obviating devices 140 and 142 in FIG. 1.

A lossy component, such as an optical cross-connect switch, can be placed either before the AO3R device or inside of it after the AO2R device and before the signal is split to the AOCR clock recovery and the AOR retiming devices. The use of a commercial AOCR device 130 predicates a modular structure to the overall AO3R scheme as shown in FIG. 1. One embodiment of this assembly can be a multi-chip module (MCM) based on the Silicon Optical Bench (SiOB) technology. In such an embodiment the interconnection between the individual chips that make up the four main components, i.e. AO2R 120, AOCR 130, AOR 131 and AOC RZ/NRZ and Wavelength Converter 140, each of which utilizes the same symmetrical MZI with SOAs in each arm structure, is provided by silica waveguides on a silicon substrate.

A preferred embodiment of the AO3R can be a completely integrated subsystem on an InP substrate. This would imply that the structure of the AO2R would consist of an SOA-MZI integrated with a laser, and the similar structures would be composed of SOA-MZIs integrated with lasers as required by their function (e.g., AOCR, Wavelength Converter). Such an integration is similar to the implementation of an AOCR as discussed in U.S. patent application No. 09/849,441.

As discussed above, the method of the invention can be implemented using either discrete components, or in a preferred embodiment, as an integrated device in InP-based semiconductors. The latter embodiment will next be described with reference to FIG. 4.

Figure 4:
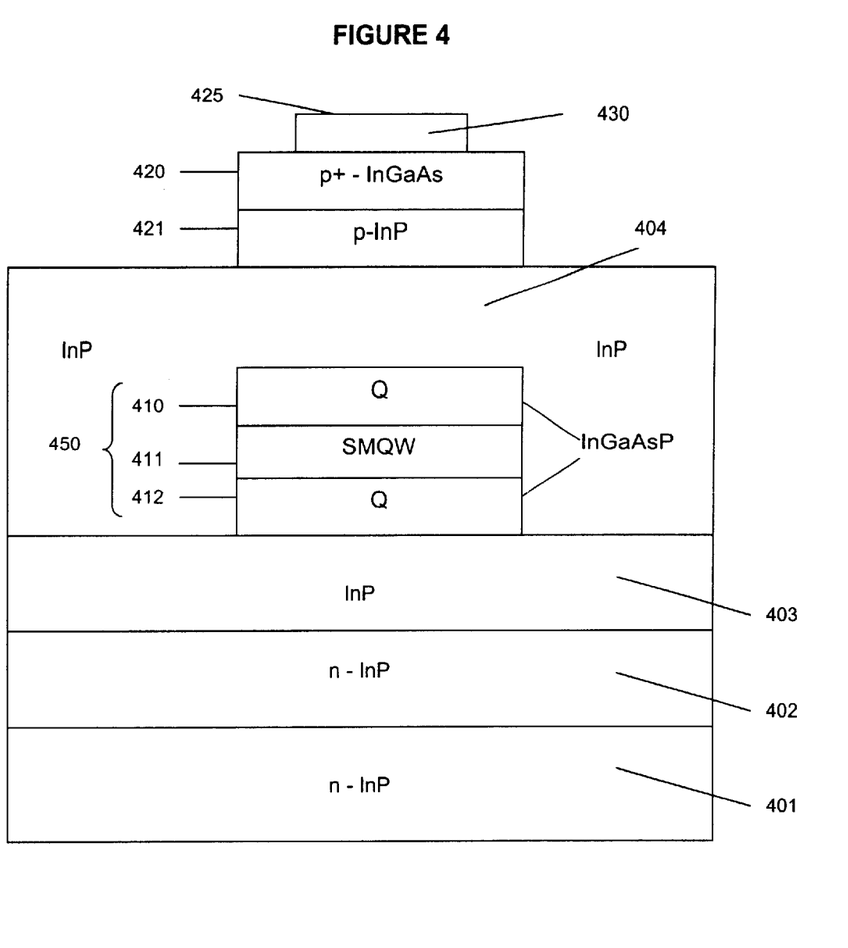
FIG. 4 depicts the cross section of an exemplary SOA-AMZI device according to the present invention.

FIG. 4 depicts a cross section of an exemplary integrated circuit SOA. With reference to FIG. 2, FIG. 4 depicts a cross section of any of the depicted SOAs taken perpendicular to the direction of optical signal flow in the interferometer arms. Numerous devices of the type depicted in FIG. 4 can easily be integrated with the interferometers of the preprocessor, the closck recovery so that the entire circuit can be fabricated on one IC. The device consists of a buried sandwich structure 450 with an active Strained Multiple Quantum Well region 411 sandwiched between two waveguide layers 410 and 412 made of InGaAsP. In an exemplary embodiment, the $\lambda_g$ of the InGaAsP in layers 410 and 412 is 1.17 µm. The sandwich structure does not extend laterally along the width of the device, but rather is also surrounded on each side by the InP region 404 in which it is buried.

The active Strained MQW layer is used to insure a constant gain and phase characteristic for the SOA, independent of the polarization of the input signal polarization. The SMQW layer is made up of pairs of InGaAsP and InGaAs layers, one disposed on top of the other such that there is strain between layer interfaces, as is known in the art. In a preferred embodiment, there are three such pairs, for a total of six layers. The active region/waveguide sandwich structure 450 is buried in an undoped InP layer 404, and is laterally disposed above an undoped InP layer 403. This latter layer 403 is laterally disposed above an n-type InP layer 402 which is grown on top of a substantially doped n-type InP substrate. The substrate layer 401 has, in a preferred embodiment, a doping of $4-6\times10^{18}/cm^{-3}$. The doping of the grown layer 402 is precisely controlled, and in a preferred embodiment is on the order of $5\times10^{18}/cm^{-3}$. On top of the buried active region/waveguide sandwich structure 450 and the undoped InP layer covering it 304 is a laterally disposed p-type InP region 421. In a preferred embodiment this region will have a doping of $5\times10^{17}/cm^{-3}$. On top of the p-type InP region 421 is a highly doped p+-type InGaAs layer. In a preferred embodiment this latter region will have a doping of $1\times10^{19}/cm^{-3}$. The p-type layers 420 and 421, respectively, have a width equal to that of the active region/waveguide sandwich structure, as shown in FIG. 4. As described above, the optical signal path is perpendicular to and heading into the plane of FIG. 4.

Figure 5:
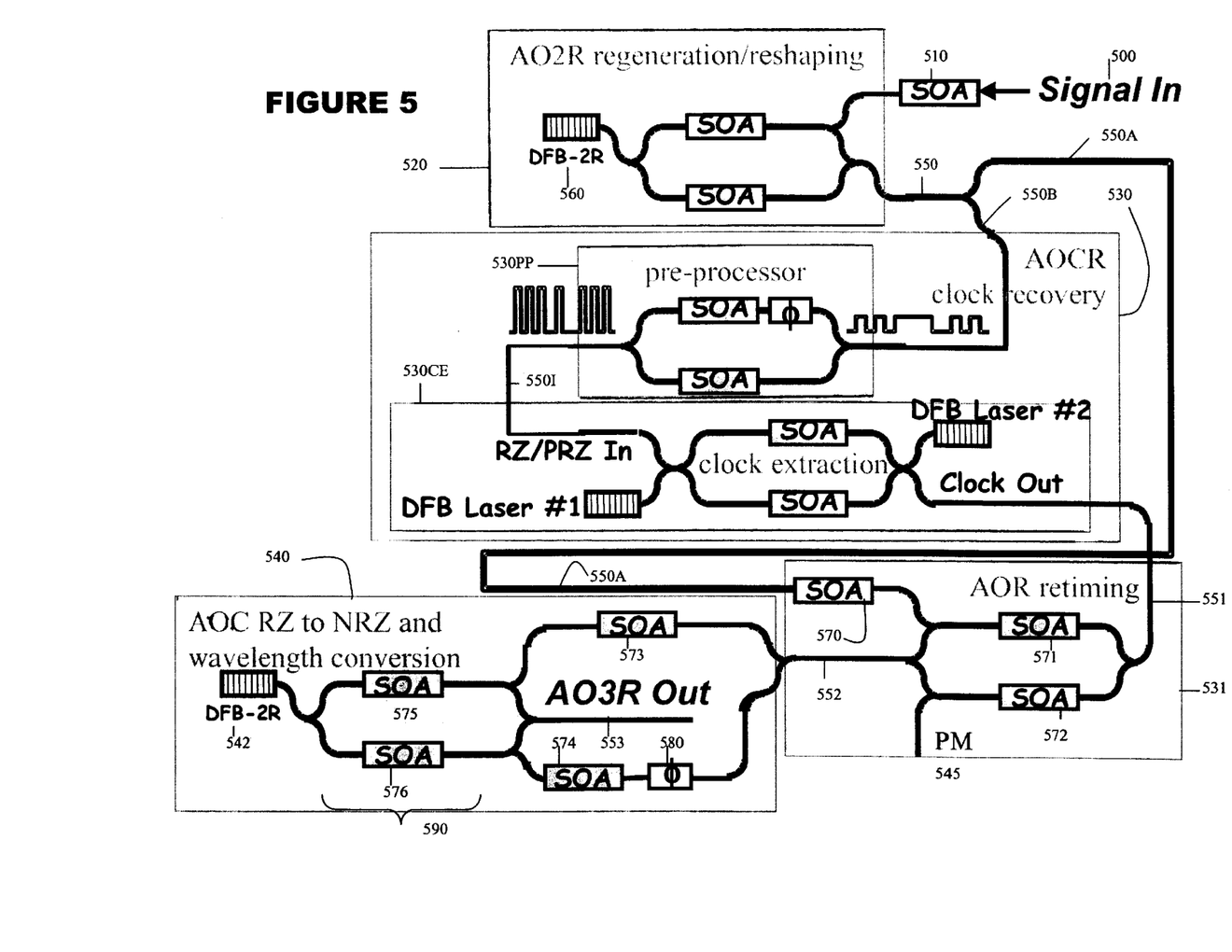
FIG. 5 depicts a schematic view of a fully integrated AO3R subsystem according to a first embodiment of the present invention, indicating the various blocks.

Utilizing the SOA described above, the entire all-optical 3R device can be integrated in one circuit. With reference to FIG. 5, a schematic layout of an exemplary fully integrated AO3R device is shown. It is noted that for ease of viewing FIG. 5 only shows the active parts of the circuit, Thus, devices with redundant structures could be used in any of the depicted modules. As well, FIG. 5 has blocks drawn around the portions of the circuit comprising the various devices and modules depicted schematically in FIG. 1. Thus, the two figures can be easily correlated. The integrated device depicted in FIG. 5 implements all of the various functionalities of FIG. 1, as will next be discussed.

There are four stages in the integrated device, corresponding to the AO2R stage 120, the Clock Recovery stage 130 (which includes the pre-processor stage), the AOR stage 131, and the AOC RZ/NRZ code and wavelength converter stage 140, of FIG. 1. In general the reference numbers in FIGS. 1 and 5 are identical in the tens and digits places, again for ease of correlation.

At the top of FIG. 5 appear the input signal 500, the pre-amplifier 510 and the AO2R stage 520. The incoming signal 500 enters at the top right of the figure, and passes through SOA 510. From there it enters the MZI, with integrated laser, of stage 520. The output from the AO2R stage 550 then bifurcates, into signals 550A and 550B. Output 550B, now a regenerated and reshaped optical pulse train goes into the clock recovery stage 530, comprising the preprocessor 530PP and the clock extraction 530CE substages. As described in the Parent Applications, if the original input was RZ coded the gain of the upper arm of the AMZI in stage 520 is set to zero, and intermediate signal 550I is RZ coded as well. If the original was NRZ coded, intermediate signal 550I is PRZ coded. The intermediate output from the preprocessor 550I is fed into the clock extraction sub-stage 530CE, which outputs the now RZ coded clock signal 551 (also possibly having undergone wavelength conversion via DFB-2R laser 560, according to a second embodiment of the invention, described below). This latter signal 551 is input to the AOR stage 531, along with the split output 550A from stage 520, which is the data signal, and is input to the AOR at SCA 570. This input 550A gates, through phase modulation in the MZI containing SOAs 571 and 572, the clock signal 551 to generate the retimed output of this stage, 552.

AOR output signal 552 is an RZ coded signal. This signal 552 is input to the code and wavelength conversion module 540. When the input signal 500 is NRZ coded, the AOR output signal 552 is fed to the MZI 590, comprising SOAs 575 and 576, through both SOAs 573 and 574. An undelayed (via SOA 573) high bit phase modulates the continuous wavelength light from DFB-2R 542 for constructive interference (as the SOAs 575 and 576 are initially set to a relative phase shift of $\pi$ (in general all SOAs in opposite arms of MZIs are so set); thus a high bit in the upper arm changes the phase difference between the two SOAs to zero, and a high bit on each SOA changes the relative phase shift back to $\pi$), and the CW light combines at the output 553 to generate a "1." When the high bit through the upper arm of MZI 590 has passed, SOA 574 then passes the delayed copy of that same bit to the MZI via delay element 580.

Using an appropriate delay, depending, inter alia, on the phase shift latency in the SOAs and the full period bit-rate of the recovered clock signal, the RZ signal is converted to an NRZ coded signal.

In this manner an NRZ pulse is generated from an incoming RZ pulse 552. When the input signal 552 is RZ coded, SOA 574 is turned off, thus blocking the delayed signal to the MZI 590 code converter. The converter thus passes the RZ pulses unchanged to the system output 553.

Wavelength conversion of the regenerated, reshaped and retimed signal 552 is achieved by tuning the frequency of the DFB laser 542. The sampled power monitor, PM 545, is sent to the feedback controller, as described above, and used to set the tuning current in SOAs 571 and 572.

The net result is the final output 553 of the entire AO3R device, which is a clean, regenerated, reshaped, and retimed optical pulse train, on a wavelength chosen by the user.

Figure 6:
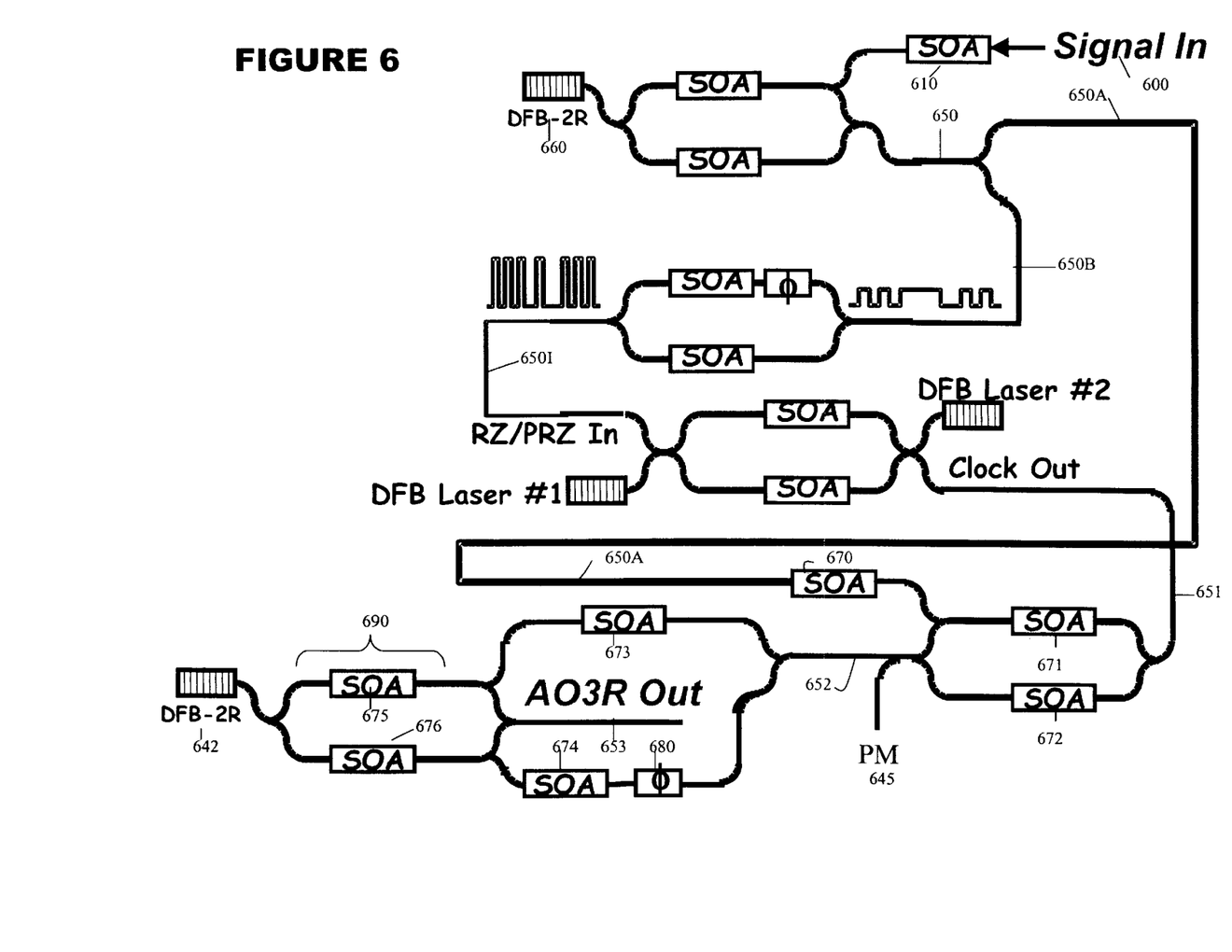
FIG. 6 depicts the subsystem of FIG. 5, without the block identifiers.

FIG. 6 is identical to FIG. 5, but is made more readable by removal of the blocks denoting the various stages. The reference numbers are identical to those in FIG. 5, except that the hundreds place digit is a "6" in FIG. 6, replacing the "5" in such index numbers from their FIG. 5 counterparts.

An exemplary method of effecting such an integrated AO3R device is next described.

After an epiwafer is grown with the waveguide and the SOA active regions, the wafer is patterned to delineate the SOAs, the AMZI and the various MZIs. In a preferred embodiment the path length difference between the two arms of the AMZI in the clock-extraction sub-stage is approximately 1 mm.

Next, the DFB regions of the second stage of the device are created using either a holographic or a non-contact interference lithographic technique. The periodicity of the grating in a preferred embodiment is approximately 2850A.

The grating is of Order 1 and provides optical feedback through second-order diffraction. The undoped InP top cladding layer, the p-type InP layers, and the contact layer are then regrown on the patterned substrate. This step is then followed by photolithography for top-contact metallization. The device is then cleaved and packaged.

Figure 7:
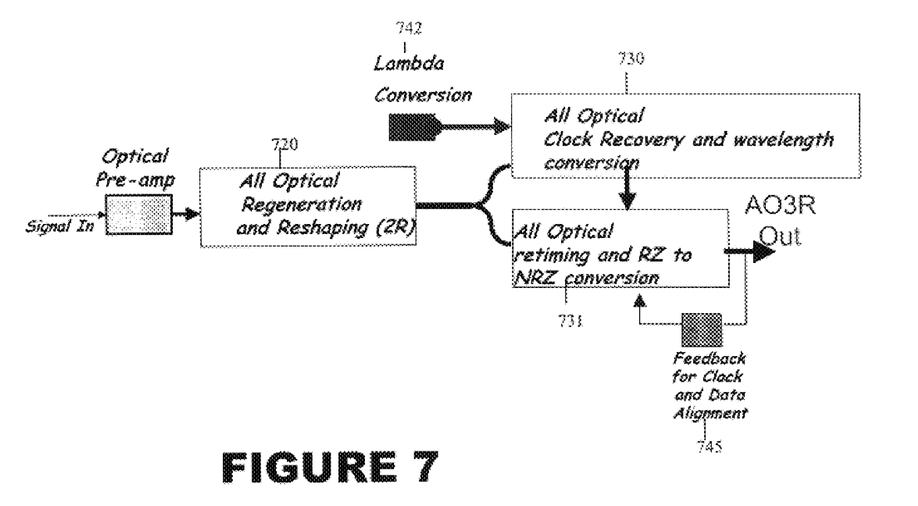
FIG. 7 depicts a schematic diagram according to a second embodiment of the present invention.
Figure 8:
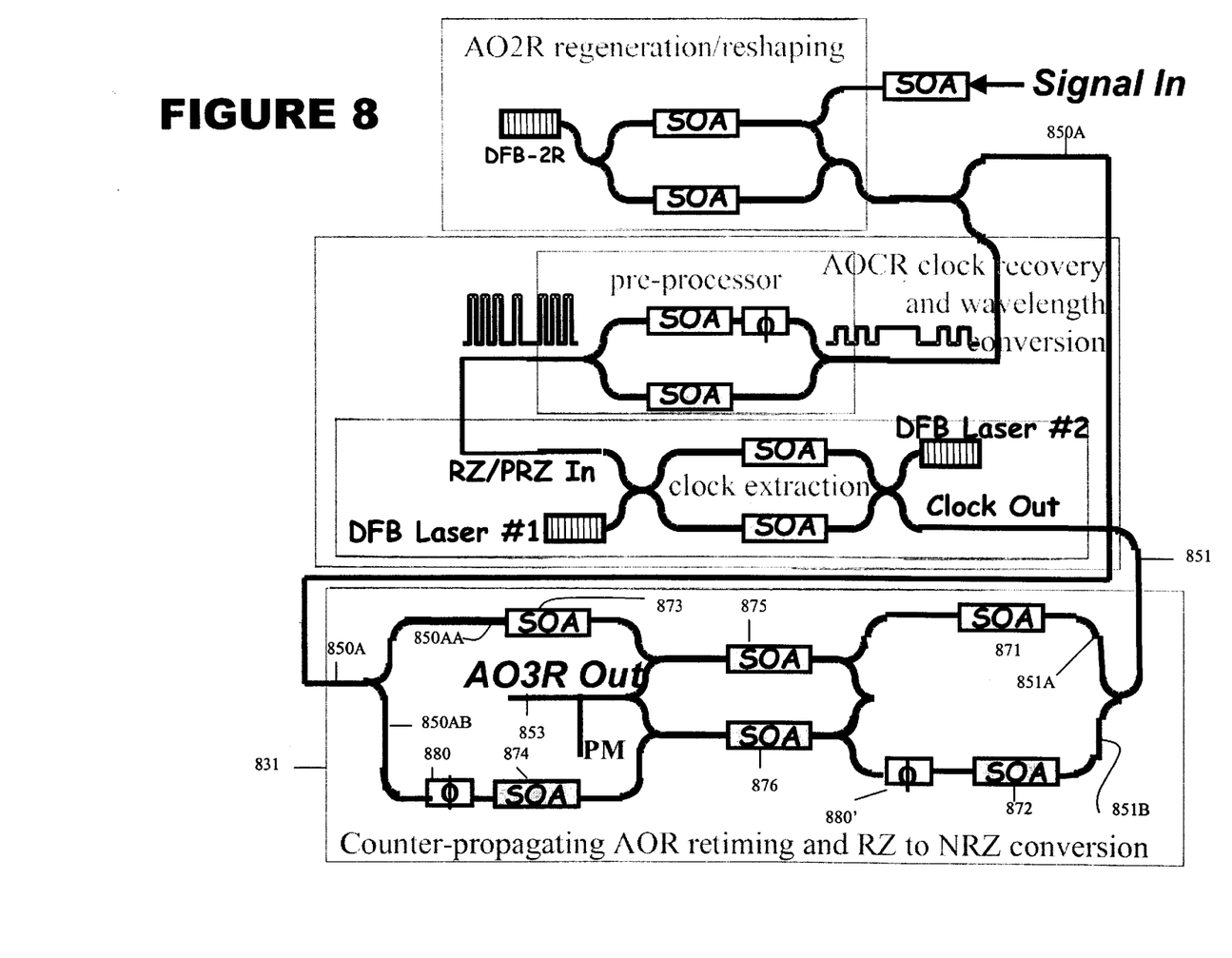
FIG. 8 depicts a first instance of a second embodiment of the fully integrated AO3R subsystem.
Figure 9:
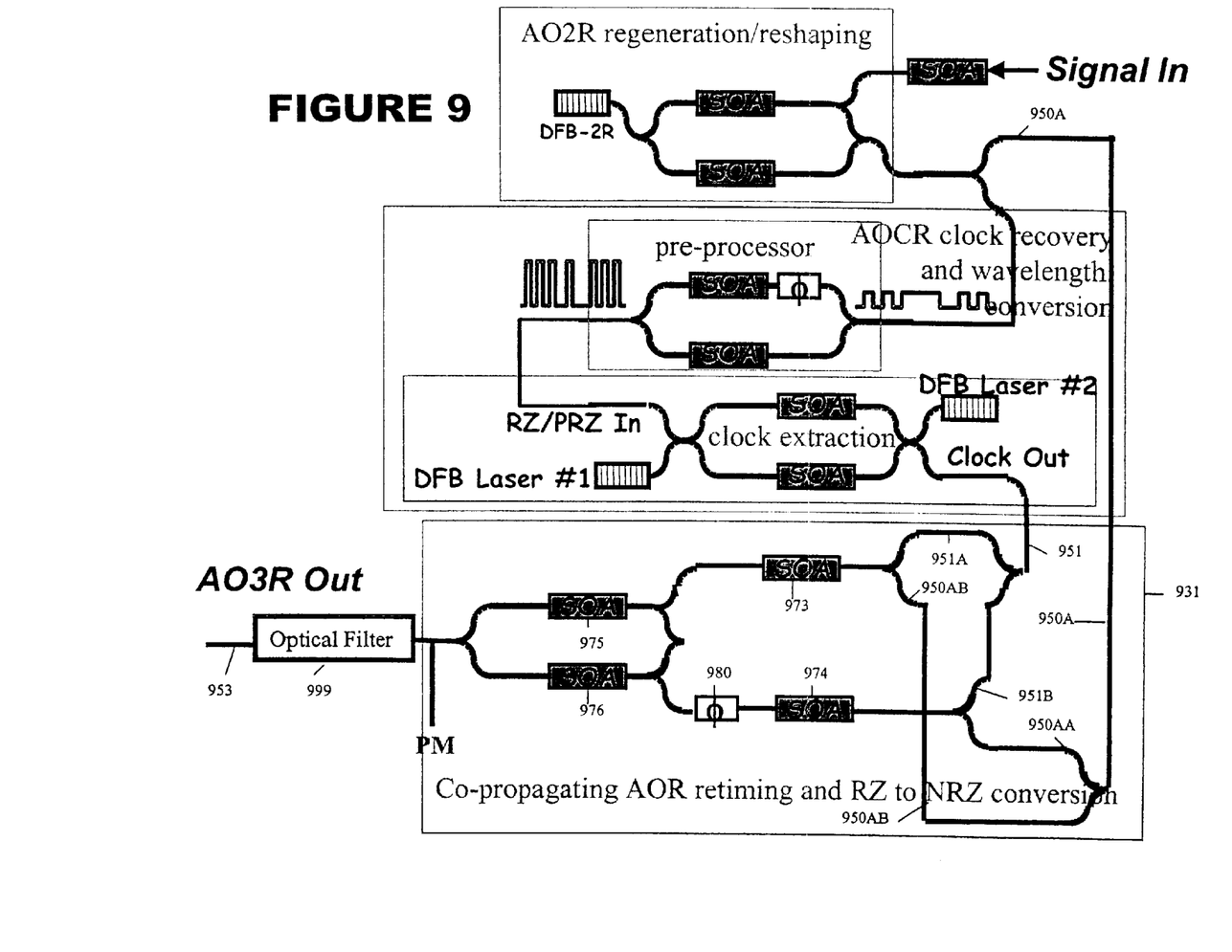
FIG. 9 depicts a second instance of a second embodiment of the fully integrated AO3R subsystem.

A second embodiment of the invention is depicted in FIGS. 7–9. In a second embodiment of the invention the RZ to NRZ conversion is implemented by the AOR retiming device. This eliminates the need for the AOC device 540 in FIG. 5. In this case the wavelength conversion is achieved by tuning carrier frequencies of the DFB lasers#1 and #2 in the clock extraction device of the AOCR, 530CE. FIG. 7 shows a functional block diagram for this case. Similar index numbers (in the tens and units digits) in FIG. 7 and FIG. 1 correlate to similar functionalities. In FIG. 7 lambda conversion 742 is now done in the AOCR module 730, and RZ/NRZ conversion in the AOR retiming module 731.

There are two instances, or versions of this second embodiemtn, depicted in FIGS. 8 and 9, respectively. FIG. 8 shows the counter-propagating implementation of the AOR/RZ-to-NRZ-conversion device. In this configuration the delayed input signal 850A and the delayed recovered clock signal 851 inputs to the AOR 831 must be both delayed by the same amount for the RZ-to-NRZ conversion, as described above, thus delay elements 880 and 880'.

FIG. 9 shows the co-propagating implementation of the AOR/RZ-to-NRZ-conversion device. In this configuration only one delay 980 is required for the coupled input and recovered clock signals. In this implementation both the retimed and converted output 951, and the regenerated input signal 950A are transferred to the output of the AOR device. In this configuration an optical filter 999 is required to filter-out the regenerated input signal 950A, 950AA, 950AB.

While the above describes the preferred embodiments of the invention, various modifications or additions will be apparent to those of skill in the art. Such modifications and additions are intended to be covered by the following claims.

What is claimed:

1. An all-optical regeneration, reshaping and retiming device, comprising four Mach-Zehnder interferometers;

one asymmetric Mach-Zehnder interferometer; and four light sources.

2. The device of claim 1, where the light sources emit continuous wavelength light.

3. The device of claim 2, where the light sources are distributed feedback lasers.

4. The device of claim 3, where there are SOAs in each arm of the inteferometers.

5. The device of any of claims 1–4, where there is an AO2R first stage, comprising an MZI;

a clock recovery second stage comprising an AMZI; and an MZI integrated with two light sources;

an all-optical retiming third stage; and a code and wavelength conversion fourth stage.

6. An all-optical regeneration, reshaping and retiming device, comprising three Mach-Zehnder interferometers;

one asymmetric Mach-Zehnder interferometer; and three continuous wavelength emitting light sources.

7. The device of claim 6, where the light sources are distributed feedback lasers.

8. The device of claim 7, where there are SOAs in each arm of the inteferometers.

9. The device of any of claims 6,7, or 8, where there is an AO2R first stage, comprising an MZI;

a clock recovery second stage comprising an AMZI; and an MZI integrated with two light sources; and an all-optical retiming and code conversion third stage.

10. The device of claim 9, where wavelength conversion is done in the second stage.

11. The device of claim 10, where within the third stage the recovered clock signal and the data signal co-propagate.

12. The device of claim 11, where within the third stage the recovered clock signal and the data signal counter-propogate.

13. An all-optical regeneration, reshaping and retiming device, comprising
- three Mach-Zehnder interferometers;
- one asymmetric Mach-Zehnder interferometer; and
- three light sources;
- where the light sources are distributed feedback lasers that emit continuous wavelength light; and
- where there are SOAs in each arm of the inteferometers.

14. The device of claim 13, where there is
- an AO2R first stage, comprising an MZI;
- a clock recovery second stage comprising
  - an AMZI; and
  - an MZI integrated with two light sources; and
- an all-optical retiming and code conversion third stage.

15. The device of claim 14, where wavelength conversion is done in the second stage.

16. The device of claim 15, where within the third stage the recovered clock signal and the data signal co-propogate.

17. The device of claim 16, where within the third stage the recovered clock signal and the data signal counter-propagate.

* * * * *